(12) United States Patent
Miller et al.

(10) Patent No.: US 6,305,800 B1
(45) Date of Patent: Oct. 23, 2001

(54) OPHTHALMIC LENS

(75) Inventors: Anthony Dennis Miller, Bellevue Heights; Saulius Raymond Varnas, Brighton, both of (AU)

(73) Assignee: Sola International Holdings Ltd., Lonsdale (AU)

( * ) Notice: Subject to any disclaimer, the term of this patent is extended or adjusted under 35 U.S.C. 154(b) by 0 days.

(21) Appl. No.: 09/509,796

(22) PCT Filed: Oct. 23, 1998

(86) PCT No.: PCT/AU98/00881
§ 371 Date: Jun. 16, 2000
§ 102(e) Date: Jun. 16, 2000

(87) PCT Pub. No.: WO99/23526
PCT Pub. Date: May 14, 1999

(30) Foreign Application Priority Data

Nov. 3, 1997 (AU) .................................................. PP0161

(51) Int. Cl.[7] ....................................................... G02C 7/02
(52) U.S. Cl. ............................................. 351/159; 351/177
(58) Field of Search ..................................... 351/168, 169, 351/170, 171, 172, 176, 159

(56) References Cited

U.S. PATENT DOCUMENTS

| | | |
|---|---|---|
| 4,195,919 | 4/1980 | Shelton . |
| 5,220,359 | 6/1993 | Roffman . |
| 5,715,032 | 2/1998 | Isenberg . |

FOREIGN PATENT DOCUMENTS

| | | |
|---|---|---|
| 3622757 | 1/1987 | (DE) . |
| 3729845 | 3/1989 | (DE) . |
| 94/25887 | 11/1994 | (WO) . |

*Primary Examiner*—Scott J. Sugarman
(74) *Attorney, Agent, or Firm*—Burns, Doane, Swecker & Mathis, L.L.P.

(57) ABSTRACT

An ophthalmic lens element having a first surface and an atoroidal or generally aspheric second surface. The second surface is described by a symmetric polynomial whose coefficients have been chosen to minimize a merit function constructed of the sum of a particular optical aberration over substantially the entire surface thereof.

22 Claims, 3 Drawing Sheets

Figure 3B:
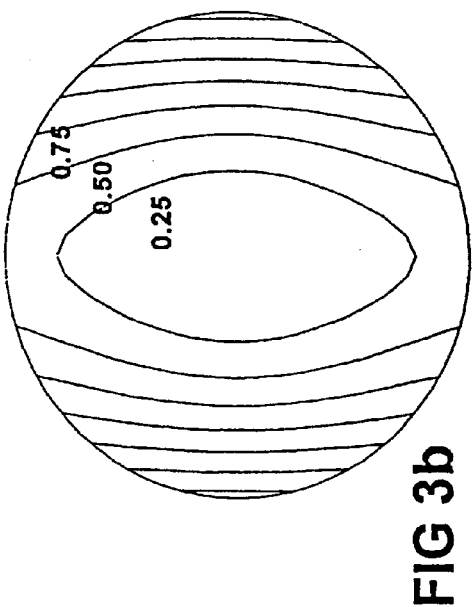
Figure 3D:
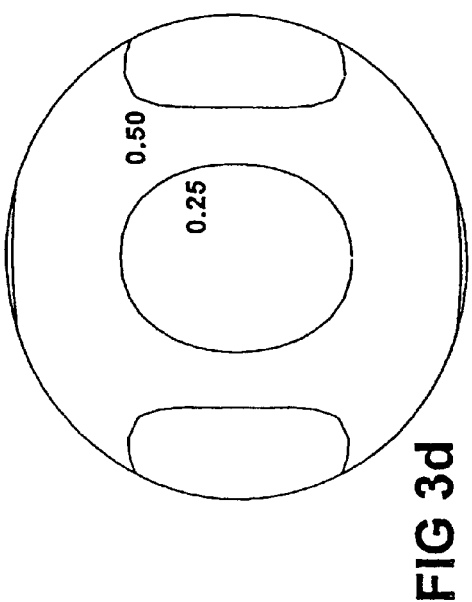
Figure 3A:
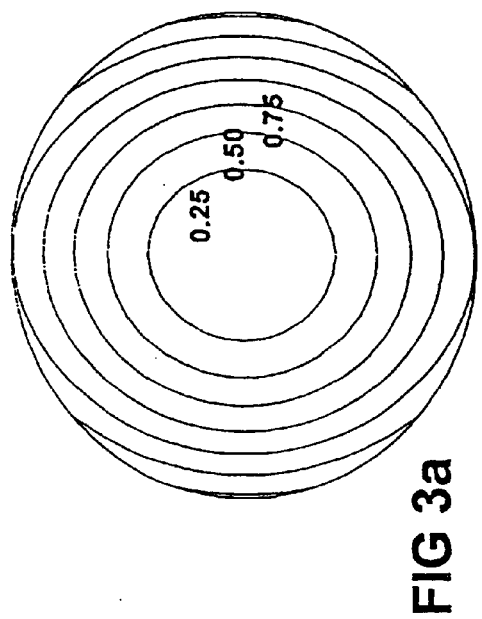
Figure 3C:
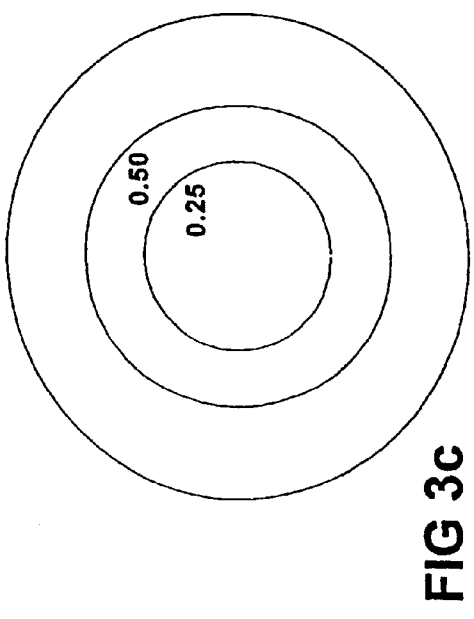

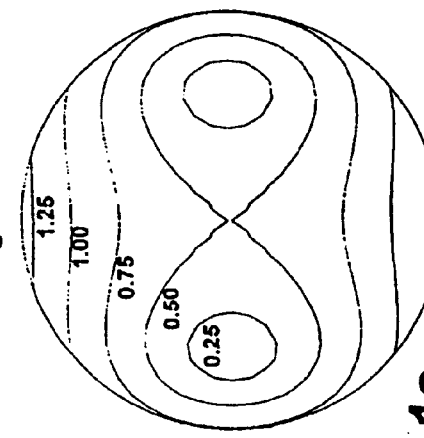
FIG 1a BS Astigmatism
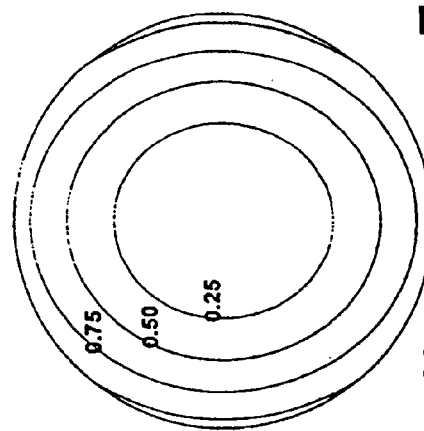
FIG 1b BS Mean Power
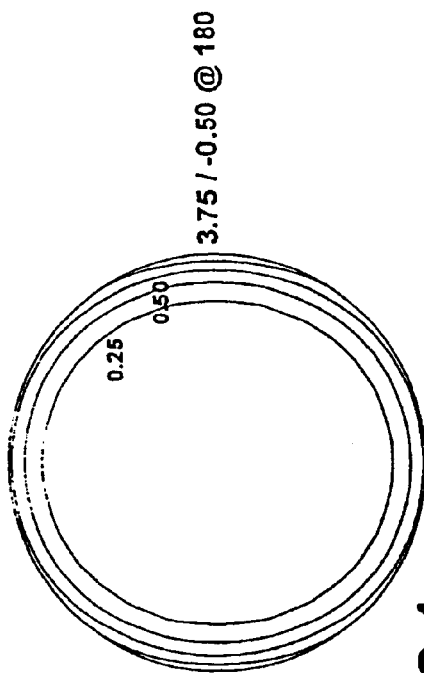
FIG 1c Optical RMS Blur
3.75 / -0.50 @ 180
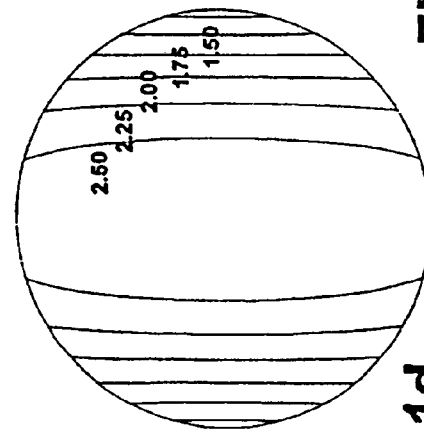
FIG 1d
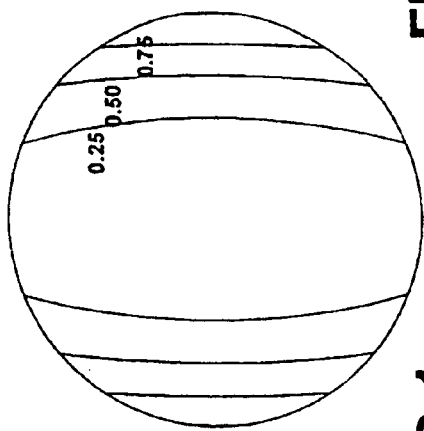
FIG 1e
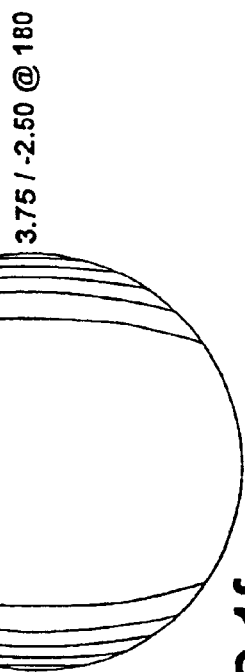
FIG 1f
3.75 / -2.50 @ 180

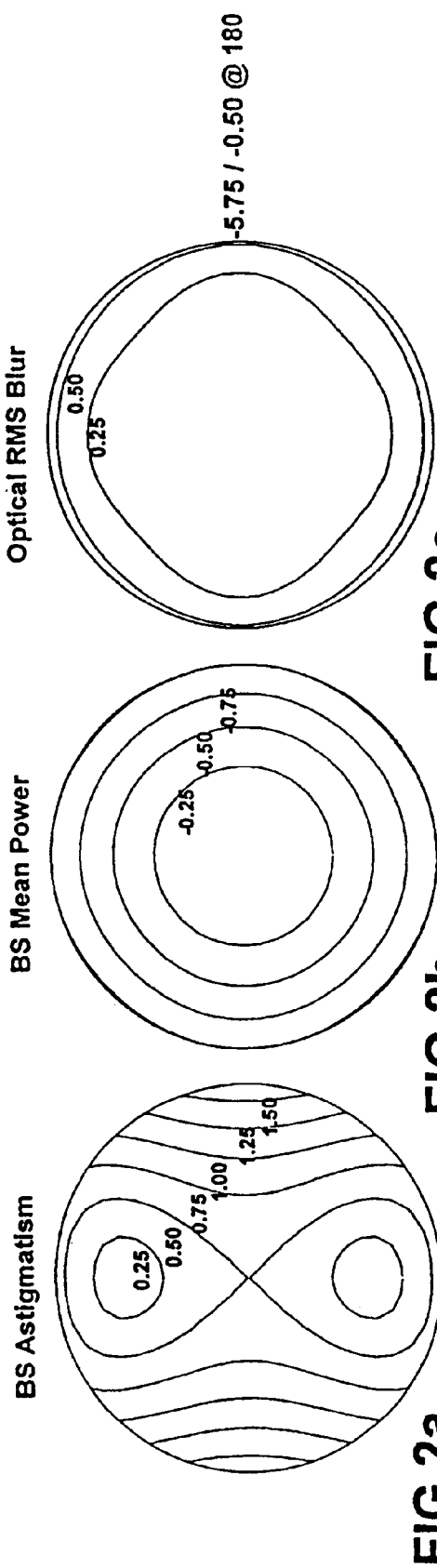
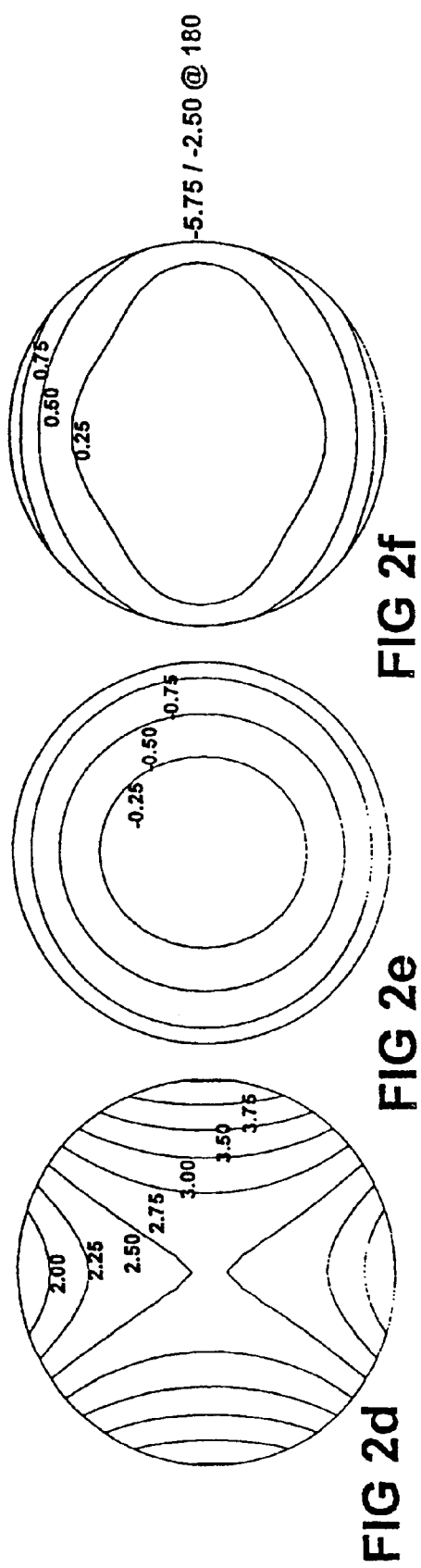

OPHTHALMIC LENS

FIELD OF THE INVENTION

The present invention relates to an improved single vision ophthalmic lens. The invention particularly relates to methods of surface correction to improve the optical performance of a single vision ophthalmic lens by reducing optical aberrations, such as those associated with power and astigmatic errors, together with lenses produced by such methods.

BACKGROUND OF THE INVENTION

Conventional single vision lenses do not adequately correct for optical aberrations apparent to the wearer when viewing objects, through the lens, at oblique angles. This results from the lens surfaces not being the ideal shape to fully correct for the wearer's specific needs of power, cylinder correction and fitting requirements for off-axis vision.

Attempts have been made to correct such errors in the prior art with limited success, and have most often resulted in compromises that either do not fully correct the entire lens surface or that inadequately address the optical aberrations and errors.

Typically, prior art attempts introduced corrections by aspherising one or both of the lens surfaces for spherical or toric corrections. For example, typical prior art methods have relied on aspherising the two principle toric meridians of the lens back surface, improving the optical performance of these meridians independent of each other. This method has proven to be deficient in that the regions between the two principle meridians are not sufficiently optically optimised in the same way as the vision along the principle meridians.

Other methods have typically included minimising astigmatism on a grid of points on the lens surface using optical ray tracing techniques, following which a twice continuously differentiable spline surface (satisfying the data at each point) is fitted. However, it is only possible to satisfy these conditions for a limited range of simple surfaces that cover only a fraction of all surfaces that are of interest to the ophthalmic industry. In other cases, such an approach normally requires the fitting of a smoothing spline surface in an attempt to approximate the calculated data at each point, without satisfying it exactly. As a result, the optics of such a surface often significantly deviates from the optimal case.

It is an object of the present invention to provide an improved single vision ophthalmic lens that overcomes the difficulties identified above with prior art single vision ophthalmic lenses.

SUMMARY OF THE INVENTION

The present invention provides an ophthalmic lens element having a first surface and an atoroidal or generally aspheric second surface. The second surface is described by a symmetric polynomial whose coefficients have been chosen to minimise a merit function constructed of the sum of a particular optical aberration over substantially the entire surface thereof.

The present invention also provides a method of designing an ophthalmic lens element having a first surface and an atoroidal or generally aspheric second surface. The method includes selecting a symmetric polynomial for the second surface, selecting a merit function relating to at least one optical aberration, minimising the merit function over the substantially entire surface thereof to generate a modified surface function, and shaping the second surface to the modified surface function.

It has been found that in order to reduce optical aberrations visible to wearers, it is necessary to apply the appropriate corrections over substantially the entire ophthalmic lens element, rather than just the two principle cylinder meridians. This has the beneficial effect of making a larger area of the lens surface to have tolerable levels of optical aberrations.

GENERAL DESCRIPTION OF THE INVENTION

Before turning to a general description of various aspects of the present invention, it will be instructive to provide some definitions for various terms used above. In this respect, by the term 'lens element' we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of single vision glass lenses and moulds for the casting of single vision lenses in polymeric material.

Further, by the terms 'atoroidal surface' or 'atoric surface' we mean a surface being of a generally toric nature at the intersection of the surface and the optical axis of the lens element, but which departs from a circular section along any radial line from the surface centre. In this respect, it will be appreciated that this surface is described in the present invention by a symmetric polynomial. Also, by the term 'effective surface' we mean at least that area of the surface of a lens remaining after the edging and finishing of the lens.

In the following description, further terms will be used that may also require definition. In particular, by the term 'astigmatic correction' we mean the wearers prescribed cylinder correction and the associated axis of this correction. Also, by the terms 'astigmatism' or 'surface astigmatism' we mean a measure of the degree to which the curvature of the lens varies among intersecting planes which are normal to the surface of the lens at a point on the surface.

Finally, by the term 'generally aspheric surface' we mean a surface bearing no particular cylinder and whose surface departs from a circular section along any radial line from the surface centre. It will be appreciated that in the present invention, such a surface is described by a symmetric polynomial such that $C_{2,0}$ and $C_{02}$ are substantially equal. In this respect, $C_{2,0}$ and $C_{1,2}$ may differ to correct for optical performance, but are substantially different to the wearer's prescription cylinder needs.

Turning now to a general description of the invention, in one preferred form a particular combination of optical aberrations may be minimised over substantially the entire aperture of the ophthalmic lens element. Alternatively, a particular measure of optical aberrations may be controlled, so that it increases gradually from the optical centre to the periphery of the ophthalmic lens element but stays below a certain threshold known to be just detectable by most wearers. The purpose of such an alternative is to allow for the provision of a lens element with a cosmetic improvement, such as a thinner and lighter lens, without any noticeable degradation in optical performance.

The first surface of the ophthalmic lens element of the present invention may be a spherical surface, a toric surface, or a rotationally symmetric aspheric surface, chosen to produce the best optical and/or cosmetic performance for the wearers overall prescription.

It should be noted that the first surface referred to above may be either the front surface or the back surface of the lens element, which implies that the second surface will conversely be either of the back surface or the front surface respectively of the lens element.

Thus, the first surface may be the front surface, which then becomes fixed while the modifications are worked to the back surface. The front surface may then be any of a spherical surface, a toric surface, or a rotationally symmetric aspheric surface, as mentioned above. In this form, it is then the back surface that has an atoroidal or generally aspheric shape and is described by the symmetric polynomial whose coefficients have been chosen to minimise a merit function constructed of the sum of a particular optical aberration over substantially the entire surface thereof.

Alternatively, the first surface may be the back surface, which then becomes fixed while the modifications are worked to the front surface. The back surface may then be any of a spherical surface, a toric surface, or a rotationally symmetric aspheric surface, as described above. In this form, it will be the front surface that has an atoroidal or generally aspheric shape and is described by the symmetric polynomial whose coefficients have been chosen to minimise a merit function constructed of the sum of a particular optical aberration over substantially the entire surface thereof.

In a preferred form, the present invention thus provides an ophthalmic lens element including a front, generally spherical surface (or a front, toric surface) providing the overall base curve (or for the toric surface, providing a cylinder correction) required to correct for the wearer's mean power error in combination with the mean curvature of the back surface. The back surface may then have an atoroidal or generally aspheric shape and be described by the symmetric polynomial whose coefficients have been chosen to minimise a merit function constructed of the sum of a particular optical aberration over substantially the entire surface thereof.

In this form, the front surface may additionally be flattened to provide a cosmetic benefit, and the mean power of the back surface may be adjusted to provide the required lens power. Alternatively, the front surface in this form may be selected to be an aspheric surface to improve the optical performance which may be degraded during the flattening of the lens form, as it would depart from best form for the given prescription correction.

In another form, the present invention also provides an improved ophthalmic lens that includes a first surface wafer having a first lens surface, and a second surface wafer having a second lens surface. As above, the second surface may then have an atoroidal or generally aspheric shape and be described by a symmetric polynomial whose coefficients have been chosen to minimise a merit function constructed of the sum of a particular optical aberration over substantially the entire surface thereof.

In an alternative of this form of the invention, there may further be provided an ophthalmic lens element in the form of a second surface wafer for use with a first surface wafer, the second surface wafer having a front surface and a back surface. The front surface of the second surface wafer may be described by a symmetric polynomial whose coefficients have been chosen to minimise a merit function constructed of the sum of a particular optical aberration over substantially the entire surface thereof. The back surface of the second surface wafer may then be suitable for combination with the first surface wafer.

In relation to the modification to be made to. the second surface of the ophthalmic lens element of the present invention (in terms of it being described by a symmetric polynomial whose coefficients have been chosen to minimise a merit function constructed of the sum of a particular optical aberration over substantially the entire surface thereof), in a preferred form, the present invention provides a method of designing an ophthalmic lens element. The preferred method includes the steps of:

selecting a base surface function for the second lens surface in the form of an $n^{th}$ order symmetric polynomial of the form $$z = \sum_{k=0,2,\ldots}^{n} \sum_{j=0,2,\ldots}^{k} C_{k-j,j} x^{k-j} y^{j};$$

selecting a merit function relating to at least one optical aberration characteristic of the lens that needs to be minimised;

computing the coefficients of the symmetric polynomial surface $C_{k-j,j}$ that minimise the merit function over the substantially entire surface of the ophthalmic lens element to generate a modified surface function; and fabricating an ophthalmic lens element having a second lens surface shaped according to the modified surface function.

Alternatively, the method may be altered such that the selection of a merit function is the selection of a merit function modified to relate at least one optical aberration characteristic together with at least one lens cosmetic characteristic to a merit figure. Such a modified merit function may operate, for example, to modify the lens thickness, for example towards the periphery of the lens.

In considering the types of merit functions that may be used in this method, it should firstly be noted that there are a number of measures of the lens optical aberrations as seen by the wearer, such as:

$$\text{mean power error (mpe)} = \frac{\varepsilon_{11} + \varepsilon_{22}}{2}$$

$$\text{astigmatic error (cyl)} = ((\varepsilon_{11} - \varepsilon_{22})^2 + 4\varepsilon_{12}^2)^{1/2}$$

$$\text{rms blur} = \left(\frac{\varepsilon_{11}^2 + 2\varepsilon_{12}^2 + \varepsilon_{22}^2}{2}\right)^{1/2}$$

$$= \left((\text{mpe})^2 + \frac{1}{4}(\text{cyl error})^2\right)^{1/2}$$

where $\varepsilon$ is the focal error matrix that may be written as:

$$\varepsilon = \begin{pmatrix} \varepsilon_{11} & \varepsilon_{12} \\ \varepsilon_{21} & \varepsilon_{22} \end{pmatrix}$$

where $\varepsilon_{12} = \varepsilon_{21}$ by the choice of the orthomormal basis set.

Referring to these lens optical aberrations, four possible merit functions that may be utilised in the above method, depending upon the specific application of the optimised lens, are as follows:

$$M_1 = \sum_{\theta} (\text{rms blur})_{\theta}^2$$

$$M_2 = \sum_{\theta} ((\text{mpe})^2 + (\text{cyl error})^2)_{\theta}$$

-continued $$M_3 = \sum_\theta \left(\frac{1}{16}(\text{mpe})^2 + (\text{cyl error})^2\right)_\theta$$

$$M_4 = \sum_\theta \left((\text{mpe})^2 + \frac{1}{16}(\text{cyl error})^2\right)_\theta$$

where summations are over a number of sample eye rotations θ. These sample eye rotations are selected along a set of meridians covering substantially the entire surface of the lens element.

In relation to these merit functions, $M_1$ represents a simple merit function based solely on rms blur, and is a preferred merit function for use in the present invention. $M_2$ represents a merit function which provides a balanced weighting between the impact of mean power error and cyl error. The modes $M_3$ and $M_4$ represent "minimum astigmatic error" and "minimum mean power error" strategies respectively.

In a still further embodiment, a term may be included in the merit function that represents the cosmetics of the lens. For example, instead of using any merit function, M, alone, a modified merit function may be defined by:

$$M^* = M + \eta_\theta \lambda^2 \left(\frac{V}{\pi r^2}\right)^2$$

where $\eta_{74}$ denotes the number of sample eye rotations θ considered in M, r is a specified lens radius, and V is the lens volume out to the radius r. The factor λ is seen to be a weighting on the average lens thickness.

The ophthalmic lens element of the present invention may be formed from glass or from a polymeric article. The polymeric article, where applicable, may be of any suitable type. A polycarbonate, for example a material of the diallyl glycol carbonate type, may be used. The polymeric article may be formed from cross-linkable polymeric casting compositions, such as described in the applicant's U.S. Pat. No. 4,912,155, U.S. patent application Ser. No. 07/781,392, Australian Patent applications 50581/93 and 50582/93, or its European patent 453159A2. Such cross-linkable polymeric casting compositions may include a diacrylate or dimethacrylate monomer (such as polyoxyalkylene glycol diacrylate or dimethacrylate or a bisphenol fluorene diacrylate or dimethacrylate) and a polymerisable comonomer, for example methacrylates, acrylates, vinyls, vinyl ethers, allyls, aromatic olefins, ethers, polythiols and the like.

DESCRIPTION OF EXAMPLES OF INVENTION

The present invention will now be described with reference to a series of examples and accompanying illustrations. However, it is to be appreciated that the following description is not to limit the generality of the above description.

FIG. 1 illustrates two lenses of the present invention having positive sphere powers of 3.75 D. The front surface of these lenses is a sphere of 4.63 D. The back surface is atoric optimised for the cylinder values of −0.50 D in FIGS. 1(a), (b), (c) and −2.50 D in FIGS. 1(d), (e), (f). The coefficients of the $4^{th}$ order symmetric polynomial describing the form of the respective atoric surfaces are given in Tables 1 and 2. FIGS. 1(a) and (c) show the back surface astigmatism contour plot, FIGS. 1(b) and (d) display the mean back surface power, while FIGS. 1(c) and (f) show the ray traced optical RMS blur created by each of these lenses respectively. Contours are incremented by 0.25 D and the diameter of the circle is 60 mm in all the Figures.

TABLE 1

Coefficients of the symmetric polynomial

Optimised for 3.75/−0.50

| $X^2$ | $Y^2$ | |
|---|---|---|
| 1.23E-03 | 1.66E-03 | |
| $X^4$ | $X^2Y^2$ | $Y^4$ |
| 2.79E-07 | 4.45E-07 | 2.16E-07 |

TABLE 2

Coefficients of the symmetric polynomial

Optimised for 3.75/−2.50

| $X^2$ | $Y^2$ | |
|---|---|---|
| 1.23E-03 | 3.36E-07 | |
| $X^4$ | $X^2Y^2$ | $Y^4$ |
| 2.96E-07 | 2.22E-07 | 5.13E-08 |

FIG. 2 illustrates two lenses of the present invention having negative sphere powers of −5.75 D. The front surface of these lenses is a sphere of 1.32 D. The back surface is atoric optimised for the cylinder values of −0.50 D in FIGS. 1(a), (b), (c) and −2.50 D in FIGS. 1(d), (e), (f). The coefficients of the $4^{th}$ order symmetric polynomial describing the form of the respective atoric surfaces are given in Tables 3 and 4. FIGS. 1(a) and (c) show the back surface astigmatism contour plot, FIGS. 1(b) and (d) display the mean back surface power, while FIGS. 1(c) and (f) show the ray traced optical RMS blur created by each of these lenses respectively. Contours are incremented by 0.25 D in all figures.

TABLE 3

Coefficients of the symmetric polynomial

Optimised for −5.75/−0.50

| $X^2$ | $Y^2$ | |
|---|---|---|
| 6.15E-03 | 6.58E-03 | |
| $X^4$ | $X^2Y^2$ | $Y^4$ |
| −6.81E-08 | 4.93E-08 | −7.62E-09 |

TABLE 4

Coefficients of the symmetric polynomial

Optimised for −5.75/−2.50

| $X^2$ | $Y^2$ | |
|---|---|---|
| 6.15E-03 | 8.29E-03 | |
| $X^4$ | $X^2Y^2$ | $Y^4$ |
| −5.24E-08 | 3.57E-07 | 4.12E-07 |

FIG. 3 shows the optical RMS blur contours for the conventional toric lenses of the same prescriptions as those in FIGS. 1 and 2.

Finally, it will be appreciated that there may be other variations and modifications made to the features described above, which may also be within the scope of the present invention.

What is claimed is:

1. An ophthalmic lens element having a first surface and an atoroidal or generally aspheric second surface, the second surface being described by a symmetric polynomial whose coefficients have been chosen to minimize a merit function constructed of the sum of a particular optical aberration over substantially the entire surface thereof.

2. An ophthalmic lens element according to claim 1 wherein a combination of optical aberrations are minimized over substantially the entire aperture of the ophthalmic lens element.

3. An ophthalmic lens element according to claim 1, wherein a measure of optical aberrations are controlled, so that the optical aberrations increase gradually from the optical centre to the periphery of the ophthalmic lens element, but stay below a certain threshold known to be just detectable by most wearers, allowing for the provision of a lens element with a cosmetic improvement, without any noticeable degradation in optical performance.

4. An ophthalmic lens element according to any one of claims 1 to 3, wherein the first is a spherical surface, a toric surface, or a rotationally symmetric aspheric surface, chosen to produce the best optical and/or cosmetic performance for the wearer's overall prescription.

5. An ophthalmic lens element according to any one of claims 1 to 3, wherein the first surface is the front surface, the front surface being any of a spherical surface, a toric surface, or a rotationally symmetric aspheric surface, the back surface having an atoroidal or generally aspheric shape and being described by the symmetric polynomial whose coefficients have been chosen to minimize a merit function constructed of the sum of a particular optical aberration over substantially the entire surface thereof.

6. An ophthalmic lens element according to claim 5, including a front, generally spherical surface providing overall base curve required to correct for a wearer's mean power correction in combination with the mean curvature of the back surface.

7. An ophthalmic lens element according to claim 5, including a front, toric surface providing a cylinder correction whose powers are chosen to provide the lens power necessary in combination with the back surface.

8. An ophthalmic lens element according to claim 5 or claim 6, wherein the front surface is flattened to provide a cosmetic benefit, and the mean power of the back surface is adjusted to provide the required lens power.

9. An ophthalmic lens element according to claim 5, wherein the front surface is selected to be an aspheric surface to improve the optical performance degraded during flattening of the lens form to provide a cosmetic benefit.

10. An ophthalmic lens element according to claim 4, wherein the first surface is the front surface, the front surface being any of a spherical surface, a toric surface, or a rotationally symmetric aspheric surface, the back surface having an atoroidal or generally aspheric shape and being described by the symmetric polynomial whose coefficients have been chosen to minimize a merit function constructed of the sum of a particular optical aberration over substantially the entire surface thereof.

11. An ophthalmic lens element including a first surface wafer having a first lens surface, and a second surface wafer having a second lens surface, the second surface having an atoroidal or generally aspheric shape and being described by a symmetric polynomial whose coefficients have been chosen to minimize a merit function constructed of the sum of a particular optical aberration over substantially the entire surface thereof.

12. An ophthalmic lens element including a second surface wafer for use with a first surface wafer, the second surface wafer having a front surface and a back surface, the front surface of the second surface wafer having an atoroidal or generally aspheric shape and being described by a symmetric polynomial whose coefficients have been chosen to minimize a merit function constructed of the sum of a particular optical aberration over substantially the entire surface thereof, the back surface of the second surface wafer being suitable for combination with the first surface wafer.

13. A method of designing an ophthalmic lens element having a first surface and an atoroidal or generally aspheric second surface, the method including selecting a symmetric polynomial for the second surface, selecting a merit function relating to at least one optical aberration, minimizing the merit function over the substantially entire surface thereof to generate a modified surface function, and shaping the second surface to the modified surface function.

14. An ophthalmic lens element produced in accordance with the method of claim 13.

15. A method of designing an ophthalmic lens element having a first surface and an atoroidal or generally aspheric second surface, the method including the steps of;

selecting a base surface function for the second lens surface in the form of an $n^{th}$ order symmetric polynomial of the form $$z = \sum_{k=0,2,\ldots}^{n} \sum_{j=0,2,\ldots}^{k} C_{k-j,j} x^{k-j} y^{j};$$

selecting a merit function relating to at least one optical aberration characteristic of the lens that needs to be minimized;

computing the coefficients of the symmetric polynomial surface $C_{k-j,j}$ that minimise the merit function over the substantially entire surface of the ophthalmic lens element to generate a modified surface function; and fabricating an ophthalmic lens element having a second lens surface shaped according to the modified surface function.

16. A method according to claim 15 wherein the merit function is selected from the group of merit functions comprising:

$$M_1 = \sum_{\theta} (\text{rms blur})_{\theta}^2$$

$$M_2 = \sum_{\theta} ((\text{mpe})^2 + (\text{cyl error})^2)_{\theta}$$

$$M_3 = \sum_{\theta} \left(\frac{1}{16}(\text{mpe})^2 + (\text{cyl error})^2\right)_{\theta}$$

$$M_4 = \sum_{\theta} \left((\text{mpe})^2 + \frac{1}{16}(\text{cyl error})^2\right)_{\theta}$$

where summations are over a number of sample eye rotations θ.

17. A method according to claim 15 or claim 16, wherein the selection of a merit function is the selection of a merit function modified to relate at least one optical aberration characteristic together with at least one lens cosmetic characteristic to a merit figure.

18. A method according to claim 16 wherein the modified merit function operates to modify the lens thickness towards the periphery of the lens.

19. A method according to claim 16 wherein a term is included in the merit function that represents the cosmetics of the lens, a modified merit function being defined by:

$$M^* = M + \eta_\theta \lambda^2 \left(\frac{V}{\pi r^2}\right)^2$$

where M represents any merit function, $\eta_\theta$ denotes the number of sample eye rotations $\theta$ considered in M, r is a specified lens radius, V is the lens volume out to the radius r, and the factor $\lambda$ is a weighting on the average lens thickness.

20. An ophthalmic lens element produced in accordance with the method of any one of claims 15, 16, or 18.

21. A method according to claim 17 wherein a term is included in the merit function that represents the cosmetics of the lens, a modified merit function being defined by:

$$M^* = M + \eta_\theta \lambda^2 \left(\frac{V}{\pi r^2}\right)^2$$

where M represents any merit function, $\eta_\theta$ denotes the number of sample eye rotations $\theta$ considered in M, r is a specified lens radius, V is the lens volume out to the radius r, and the factor $\lambda$ is a weighting on the average lens thickness.

22. An ophthalmic lens element produced in accordance with the method of claim 17.

* * * * *